Re. 22,276

Feb. 23, 1943.

A. N. SCHREUDER

FUEL CONTROL FOR FLUID FUEL BURNERS

Original Filed July 14, 1938 3 Sheets-Sheet 1

Inventor
Arthur N. Schreuder
by Parker & Carter
Attorneys.

Feb. 23, 1943. A. N. SCHREUDER Re. 22,276

FUEL CONTROL FOR FLUID FUEL BURNERS

Original Filed July 14, 1938 3 Sheets-Sheet 2

Inventor
Arthur N. Schreuder
by Parker & Carter
Attorneys.

Feb. 23, 1943. A. N. SCHREUDER Re. 22,276

FUEL CONTROL FOR FLUID FUEL BURNERS

Original Filed July 14, 1938 3 Sheets-Sheet 3

Inventor
Arthur N. Schreuder
by Parker Clarke
Attorneys

Reissued Feb. 23, 1943

Re. 22,276

UNITED STATES PATENT OFFICE 22,276

FUEL CONTROL FOR FLUID FUEL BURNERS

Arthur N. Schreuder, Chicago, Ill., assignor to Quaker Manufacturing Company, Chicago, Ill., a corporation of Illinois Original No. 2,237,041, dated April 1, 1941, Serial No. 219,269, July 14, 1938. Application for reissue January 23, 1942, Serial No. 427,968

18 Claims. (Cl. 236—1)

My invention relates to an improvement in control means for burners and is herein shown as applied to liquid hydrocarbon burners of a well known type.

One purpose is the provision of means for increasing and reducing air pressure in a hydrocarbon burner independently of fan or motor speed.

Another purpose is the provision of safety means for cutting off the fuel feed to such a burner when the fan or motor circuit is broken or the fan ceases to operate.

Another purpose is the provision of improved switch means for controlling the operation of such a burner.

Another purpose is the provision of improved means for controlling the delivery of liquid fuel to such a burner.

Another purpose is the provision of means for employing an air pressure responsive element to control the operation of a liquid hydrocarbon burner.

Other purposes will appear from time to time during the course of the specification and claims.

I illustrate my invention more or less diagrammatically in the accompanying drawings wherein.

Like parts are indicated by like characters throughout the specification and drawings.

Figure 1:
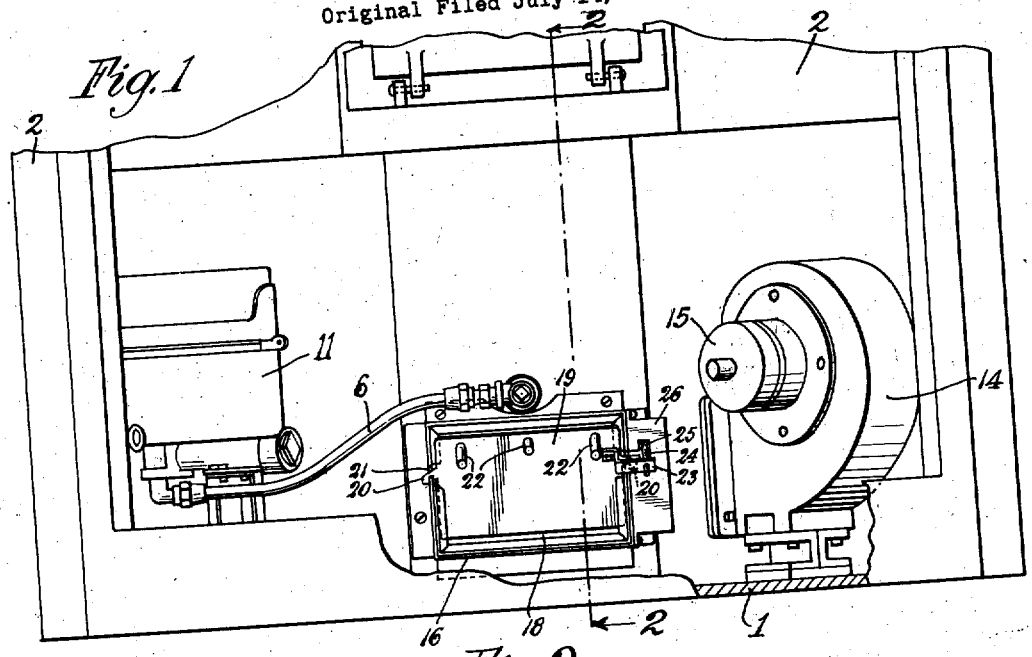
Figure 1 is a front elevation.
Figure 2:
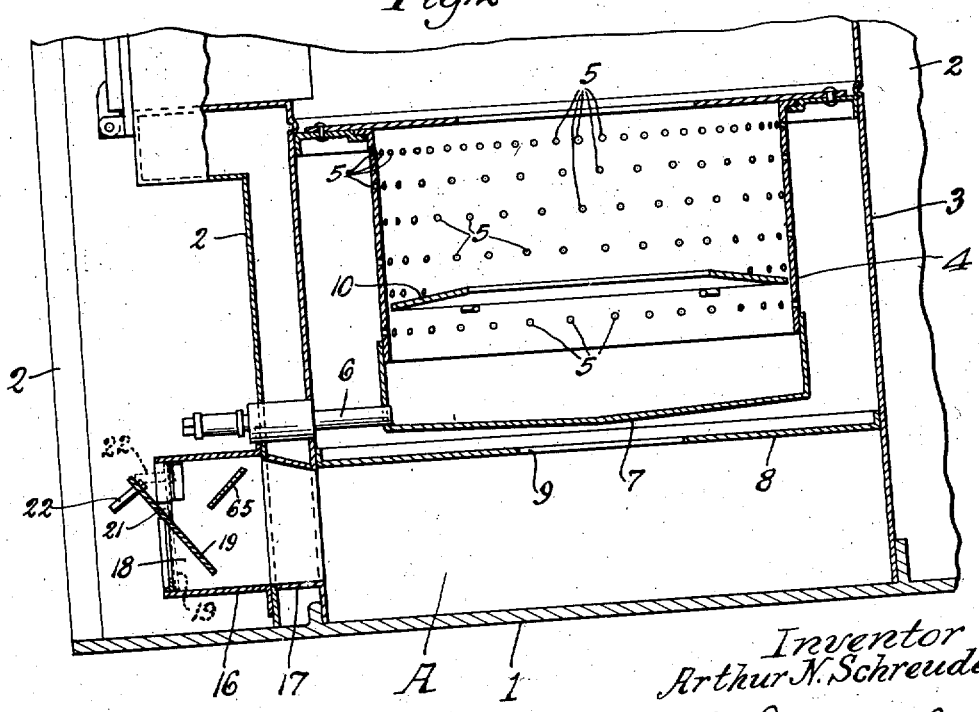
Figure 2 is a section on the line 2—2 of Figure 1.
Figure 3:
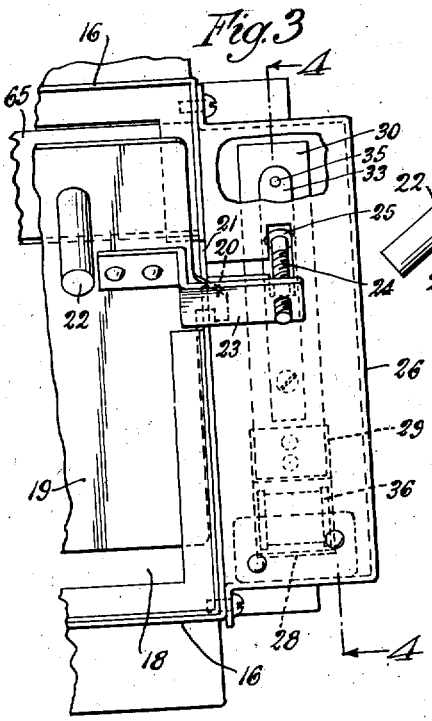
Figure 3 is a fragmentary view of a portion of the structure shown in Figures 1 and 2.

Referring to the drawings, 1 indicates any suitable base or support upon which is mounted a stove or furnace shell generally indicated at 2. Within said shell, the details of which form no part of the present invention, is located an inner heater drum 3. Mounted within the drum is a pot 4 having a plurality of air inlet apertures 5 through which air is supplied for mixture within the pot with liquid hydrocarbon supplied along the line 6. It will be observed from Figure 2 that the liquid hydrocarbon is delivered to the concave bottom 7 of the pot 4 and it will be understood that the hydrocarbon is vaporized by the heat of combustion in or above the pot and the vaporized hydrocarbon is mixed with the air flowing in through the apertures 5 and is thereafter burned. 8 indicates a baffle located beneath the pot and herein shown as centrally apertured as at 9, the air supply being delivered through the aperture 9, as will later appear. 10 indicates a pilot ring.

11 diagrammatically illustrates any suitable valve member or mechanism, the details of which do not of themselves form part of the present invention. It will be understood that it includes a variable means for providing a maximum and a minimum and an intermediate flow of liquid hydrocarbon fuel. It will be understood that at minimum setting sufficient fuel is supplied along the line 6 to maintain combustion at a low or pilot stage. At that time the pilot ring 10 is effective. For the intermediate and high fires, the air admitted through the apertures 5 below the pilot ring 10 serves as primary air which, when mixed with the vaporized hydrocarbon, rises through the central aperture of the pilot ring 10 and is burned upon mixture with the secondary air flowing through the holes 5 above the pilot ring 10.

Figure 6:
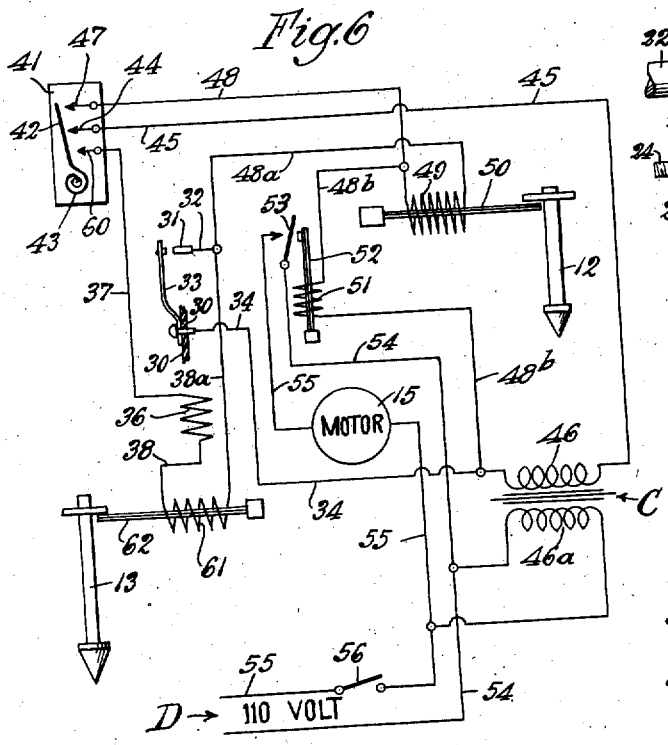
Figure 6 is a wiring diagram.

As indicating practical means of providing this three-stage flow, I illustrate in the wiring diagram of Figure 6 two oil valve members 12 and 13. When one of these valves is in closed position and one open, an intermediate supply is delivered; when both are in open position, a maximum supply is delivered. It will be understood that when both valves are closed, appropriate means are provided, by by-pass or otherwise, for maintaining the above mentioned minimum fuel supply.

14 generally indicates a shell or scroll blower actuated by a motor located within the housing 15. Any suitable fan not herein shown is associated with the motor and it will be understood that when the below described motor circuit is closed, the motor within the housing 15 is effective to rotate the fan and to cause a supply of air to enter the chamber A beneath the partition 8, which air supply passes upwardly through the aperture 9 to the space between the shell 3 and the pot 4.

Figure 4:
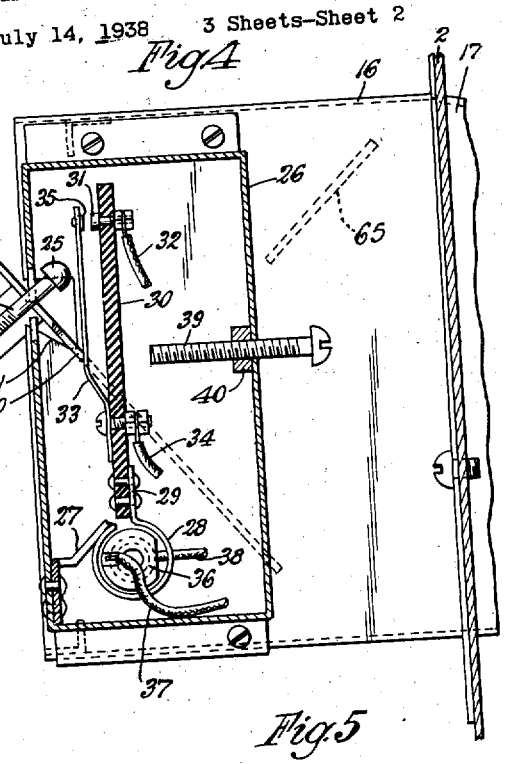
Figure 4 is a section on the line 4—4 of Figure 3.

In order to vary the pressure within the chamber A and thus to vary the air delivery to the burner, I provide an additional air port including a passage housing generally indicated as 16. 17 indicates any suitable connection between it and the chamber A. Pivoted in the opening 18 of the passage housing is a shutter or gate generally indicated as 19 which is provided with ears 20 which rest in slots 21 which serve as pivots. 22 indicates any suitable weight or weights tending to bias the gate 19 to the open position in which it is shown in Figure 4. Any suitable means may be employed for limiting the counterclockwise tilting movement of the shutter 19 in response to the weight 22. The position in which it is shown in Figure 4 is an example of a satisfactory maximum opening position.

23 indicates a bracket in the end of which is adjustably mounted the screw 24 the head 25 of which serves as an abutment the purpose of which will later appear.

26 is an additional housing mounted on the side of the passage housing 16. 27 is a bracket, secured to the housing 26, to which bracket is secured the bimetallic loop 28 shown as generally cylindrical or circular in form. It terminates in a generally radial extension 29 to which is secured an insulating bar 30. Mounted on said bar is a contact 31 having a conductive connection 32. Additionally mounted on it is a flexible leaf 33 of conductive material in circuit with the line 34. The leaf 33 is provided with a contact 35 adapted to be opposed to the contact 31, and which is in line to be engaged by the head 25 of the screw 24 in such fashion that a rotation in a clockwise direction of the shutter or gate 19 causes a closure of a circuit, which causes a conductive contact between the members 31 and 35 and thus puts the line 32 and 34 in circuit. Located within the loop or interior of the bimetallic member 28 is a resistant heating element or coil 36 having conductors 37, 38.

Figure 5:
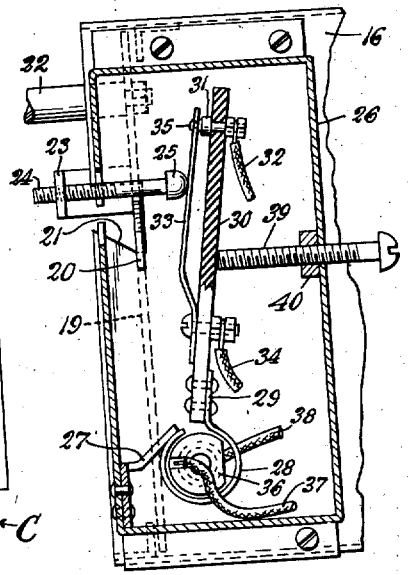
Figure 5 is a view similar to Figure 4 with the parts in a different position.

It will be understood that when the heater 36 is heated, it causes a flexure of the member 28 which moves the member 30 to the right, referring to the position of the parts in Figure 4. This movement of the insulating bar 30 can be adjustably limited by the employment of the screw stop 39 adjustable in any suitable abutment 40. Preferably the parts are so adjusted that the member 30 cannot be flexed sufficiently to the right to permit a contact between the members 31 and 35 to be broken when the gate is in the closed position in which it is shown in Figure 5.

Referring to the wiring diagram of Figure 6, 41 generally indicates a room thermostat structure having a contact strip 42, the position of which may be controlled in response to variations in room temperature, as by the bimetallic coil 43. 44 is the main line contact in circuit with the main line conductor 45 which extends to the secondary coil 46 of the transformer C. 47 is an intermediate contact in circuit with the line 48, which extends to the heating coil 49, which surrounds or affects a bimetallic strip 50 which controls any suitable valve plunger 12 already referred to. The line continues as at 48a to the line 32 of the contact 31 on the insulating part 30. Extending from the line 48 is a shunt connection 48b to the heating coil 51, which controls the bimetallic strip 52 which actuates a switch 53, which controls actuating circuit 54, 55 for the motor 15, which lines extend to any suitable source of electric power as at D.

If desired, a manually controllable switch 56 may be in circuit to break all of the above described connections. The line 48b extends beyond the heater 51 to the secondary coil 46 of the transformer C where it may join the line 34 at a common terminal. 60 is an additional contact on the thermostat 41 from which leads the line 37 which extends to the heating coil 36 for the bimetallic loop 28 (Figs. 4 and 5). The line 38 extends beyond the coil 36 to an additional heating coil 61 and extends therebeyond through line 38a and line 32 to the contact 31. The coil 61 controls a bimetallic strip 62 which controls the second oil valve 13 already mentioned. The primary coil 46a of the transformer C is connected across the lines 54, 55 in parallel with the motor.

It will be understood that the heater above described may be run at three stages. First, a pilot stage in which a minimum oil supply is supplied and the oil valves 12 and 13 are both closed. At this stage the fan is inactive and the weights 22 will hold the shutter 19 in the open position in which it is shown in Figure 4, and the burner will run at natural draft. The bulk of the air supply will flow through the inlet 18, but some may flow through the fan. In any event, there is no forced draft and preferably only sufficient combustion is maintained to provide a pilot for intermediate or full combustion.

If an intermediate fire is desired, or if the device is operated by the room thermostat, the leaf 42 bridges the contacts 44, 47. In the form herein shown, as in Figure 6, this bridging or circuit closing takes place in response to the flexure of the member 43 as the room temperature drops. The initial result of the closure is as follows. Current flows through the coil 51 and flexes the leaf 52. This closes the switch 53, which closes the motor circuit and causes the motor and fan to operate. The motor operation causes a delivery of air into the space A and upwardly about the pot 4. This air reaches the interior of the pot through the apertures 5, giving an increased air supply. At the same time, the baffle 65 in the housing 16 is effective to direct a blast or current of air against the lower half of the shutter 19. This closes or tends to close the shutter against the gravital action of the weights 22. As the shutter closes, the contact 25 on the shutter engages the flexible leaf 33 and closes the contacts 31, 35. This closes the circuit through the heater 49 and by flexing upwardly the bimetallic strip 50 raises the oil valve 12 and admits an additional supply of oil to the bottom of the pot 4. The member 30 acts as a stop and prevents a complete closure of the shutter 19, so some of the air pressure is relieved through the aperture 18 and the full effect of the fan is, therefore, not felt in the pot 4. In other words an intermediate rather than a full supply of air is delivered to the pot 4 to burn the intermediate supply of oil which is admitted by lifting the valve 12, the valve 13 being still closed.

An additional drop of the room temperature, or a manual closure, closes a further circuit between the contacts 44 and 60. One effect of this additional closure is to heat the resistance 36 and to cause the insulating bar 30 to move to the right as shown in Figure 4, in response to the flexure of the bimetallic loop 28. Continued air pressure within the chamber A and the housing 16 causes the shutter 19 to follow the bar 30 as it recedes, keeping the switch contacts 31 and 35 closed. The parts are preferably so set that the shutter 19 is substantially completely closed, as shown in Figure 5, thus preventing any relief of the air pressure within the space A and about the pot 4. As above mentioned, the stop 39 is so set as to prevent such a further recession of the member 30 as would break the contact between the members 31 and 35. A further result of a bridging of the contacts 44 and 60 is the heating of the coil 61, which causes a flexure of the strip 62, which in turn lifts the maximum oil supply valve 13. Thus a full maximum supply of oil is provided, and since any effective escape of air through the aperture 18 is prevented the air pressure and air delivery are correspondingly stepped up, a maximum supply of air being provided for the combustion of the maximum supply of oil.

When a change is made from maximum combustion to intermediate combustion and from intermediate combustion to pilot combustion, there is a reversal of the above described action. Assume that in response to thermostatic control or to manual operation the contact is broken between the contacts 44 and 60, the result is a deenergization of the coils 36 and 61, without affecting, however, the motor circuit. As the coil 36 cools, the bar 30 takes a counter-clockwise movement, referring to Figure 4, and partially opens the shutter 19 and permits a reduction of air pressure within the space A and thus a reduction of air supply to the pot 4. At the same time, the oil valve 13 is closed and the device is restored to intermediate operation. It will be noted that the increase and reduction of air pressure or air supply, as the oil supply passes from intermediate to maximum, or drops from maximum to intermediate, is obtained without affecting the operation of the fan or motor at all.

Assuming that the device is on intermediate fire and that either manually or thermostatically the contact between the members 44 and 47 is broken, this causes a de-energization of the resistance 51 which permits a breaking of the motor circuit switch 53. It also causes a de-energization of the coil 49 which controls the valve 12. The motor, therefore, stops running and the valve 12 closes, and the shutter 19 drops to the fully open position in which it is shown in Figure 4. The motor circuit cuts out immediately upon the opening of the switch 53 but the valve 12 is closed more slowly due to the time lag required for the cooling of bi-metallic member 50. Any temporary excess supply of oil is amply taken care of under the natural draft condition, as sufficient air is admitted through the aperture 18 to prevent any carbon deposit or any sooting up of the burner. This is possible because the maximum oil valve 13 has already been closed and the drop from the intermediate oil supply to minimum oil supply does not cause any carbon deposit and does not admit into the bottom of the pot 4 any more oil than can readily be burned off by a natural draft.

Figure 7:
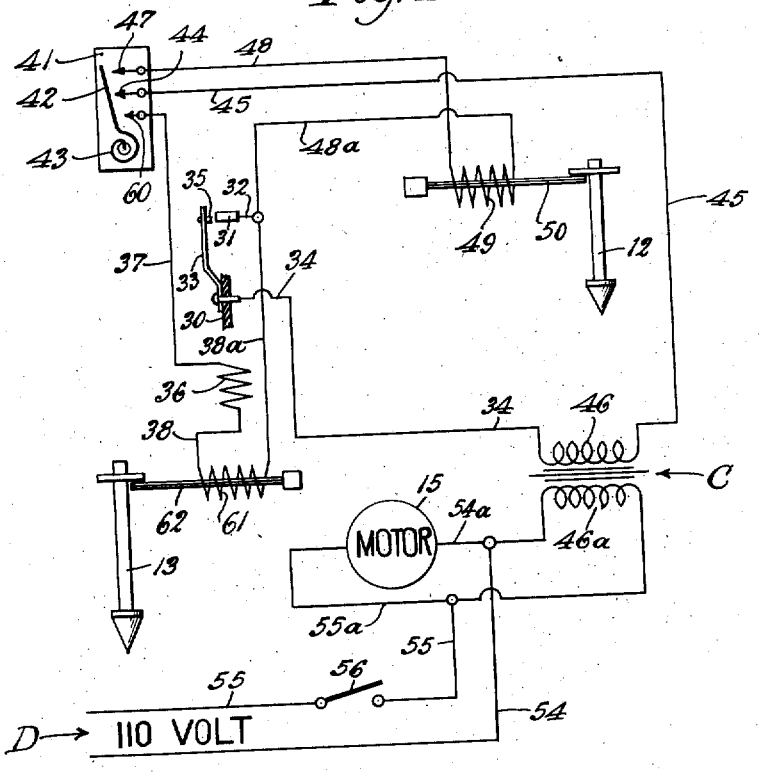
Figure 7 is a wiring diagram illustrating a variation.

It will be realized that whereas I have described and shown a practical and operative device, neverthless many changes may be made in size, shape, number, disposition and relationship of parts without departing from the spirit of my invention. For example, as shown in Figure 7, I may employ a circuit in which the fan is in operation at all stages of combustion from the pilot stage up.

As illustrated in the diagram the motor 15 is electrically connected by lines 54a and 55a to the service lines 54 and 55, respectively. Both the motor and the transformer C are manually controlled by the switch 56. The electrical connections are identical with those in the electrical diagram of Figure 6 and are indicated by like numerals with the exception that the line 48b, the heating coil 51, and the associated bimetallic strip 52 and motor switch 53 are omitted. It will be realized that in the first or pilot stage, the shutter 19, with the the motor in operation, assumes the intermediate position above described with the contacts 31 and 35 closed. When the room thermostat functions and closes the contacts 44 and 47, the heater coil 49 is energized and opens the valve 12 for an intermediate fire. However, the shutter remains in intermediate position.

It will be observed in both forms that the switch structure, including the contacts 31 and 35, serves as a safety device which cuts out the whole operating circuit in the event that the motor circuit is broken or the fan ceases to operate. It is necessary for the fan to be in operation in order to maintain the contacts 31 and 35 in contact, as otherwise the weights 22 pull the shutter into fully open position, and permit the leaf 33 to flex into circuit breaking condition. This provides a positive safety device which makes it impossible for anything more than a minimum oil supply to be delivered if the fan is not operating, and this minimum oil supply can be burned off by natural draft and will maintain at least a pilot flame in both forms of the device without causing sooting up or carbon deposit. In no event can an excess supply of oil flow into the pot 4, a supply too great for the available air to burn it off. This prevents flooding of the pot and escape of excess oil from the burner, with the consequent fire hazard which is present in so many prior art burners.

It will be understood that whereas I have shown my invention as applied to a furnace unit, it may be employed in connection with any duct used in connection with any furnace or burner, and may for example be employed in a conversion burner or unit, or in a burner completely housed outside of a heating plant. Also, it will be understood that I may employ a wide variety of switch mechanisms in the place of those shown, and may for example employ a mercury tube switch.

I claim:

1. In combination, a burner, passage means for delivering a fluid fuel to said burner, means for delivering air under pressure to said burner, a motor for actuating said air delivery means, an actuating circuit for said motor, an air admission member adapted to admit air under natural draft to the burner when said air delivery means is not operating, and adapted to permit the escape of a portion of the air under pressure, and thereby to reduce the pressure of the air delivered to the burner, when said air delivery means is operating, shutter means for said air admission member, and temperature-controlled means for setting the position of said shutter means and controlling the fuel delivery means so that the shutter will be closed and the fuel flow increased as the temperature falls.

2. In combination, a burner, passage means for delivering a fluid fuel to said burner, means for delivering air under pressure to said burner, a motor for actuating said air delivery means, an actuating circuit for said motor, an air admission member adapted to admit air under natural draft to the burner when said air delivery means is not operating, and adapted to permit the escape of a portion of the air under pressure, and thereby to reduce the pressure of the air delivered to the burner, when said air delivery means is operating, shutter means for said air admission member, responsive to air pressure created by the air delivery means, and means for controlling the fuel delivery means in response to movement of said shutter means, including a switch having a pair of normally separated contacts, and means for closing said contacts in response to movement of said shutter means.

3. In combination, a burner, passage means for delivering a fluid fuel to said burner, means for controlling the flow of fuel through said passage means in a plurality of stages, including a minimum flow, an intermediate flow, and a maximum flow, means for delivering air under pressure to said burner, a motor for actuating said air delivery means, an actuating circuit for said motor, an additional air port adapted to admit air under natural draft to the burner, when said motor driven air delivery means is not operating, and adapted to permit the escape of air under pressure, and thereby to reduce the pressure of the air delivered to the burner, when the motor driven air delivery means is operating, normally open shutter means for said additional port, said shutter means being movable toward closed position by air pressure created by the said air delivery means, a multiple contact room thermostat including a temperature responsive member, a pair of contacts adapted for initial closure thereby, and an additional contact adapted for subsequent closure, a control circuit including said initial two contacts, means for closing the motor circuit in response to closure of said control circuit, means in said control circuit adapted to increase the flow of fuel from minimum flow to intermediate flow, an additional circuit including said third contact, means in said additional circuit effective when said circuit is closed to increase the flow of fuel from intermediate flow to maximum flow, limit means for said shutter adapted to prevent its complete closure when the circuit including the initial two contacts is closed, and means responsive to the closure of the additional circuit including the third contact, effective to move said limit means and to permit a further closing movement of said shutter, and thereby to increase the air pressure adjacent the burner chamber.

4. In combination, a burner, passage means for delivering a fluid fuel to said burner, means for controlling the flow of fuel through said passage means in a plurality of stages including a minimum flow, an intermediate flow, and a maximum flow, means for delivering air under pressure to said burner, a motor for actuating said air delivery means, an actuating circuit for said motor, an additional air port adapted to admit air under natural draft to the burner, when said motor driven air delivery means is not operating, and adapted to permit the escape of air under pressure, and thereby to reduce the pressure of the air delivered to the burner, when the motor driven air delivery means is operating, normally open shutter means for said additional port, said shutter means being movable toward closed position by air pressure created by the air delivery means, stop means for limiting this closing movement of the shutter, a multiple contact room thermostat including a temperature responsive member, a pair of contacts adapted for initial closure thereby, and an additional contact adapted for subsequent closure, a control circuit including said initial two contacts, means for closing the motor circuit in response to closure of said contact circuit, means in said control circuit adapted to increase the flow of fuel from minimum flow to intermediate flow, an additional circuit including said third contact, means in said additional circuit effective when said circuit is closed to increase the flow of fuel from intermediate flow to maximum flow, other means in said last circuit for moving the stop means to permit further closing movement of the shutter and means responsive to an opening movement of said shutter for reducing the flow of fuel when the motor driven air delivery means is not operating.

5. In combination, a burner, means for supplying a fluid fuel to the burner including a valve for adjusting the rate of fuel supply, means including a blower for supplying combustion air to the burner, an auxiliary air port communicating with the burner for admitting air under natural draft when the blower is not operating and permitting the escape of a portion of the air under pressure from the blower when the blower is operating, movable damper means associated with said port for controlling the supply of air to the burner, and means for simultaneously adjusting the fuel valve and the position of the damper-means.

6. In combination, a burner, means for supplying a fluid fuel to the burner including a valve for adjusting the rate of fuel supply means including a blower for supplying combustion air to the burner, an auxiliary air port communicating with the burner for admitting air under natural draft when the blower is not operating and permitting the escape of a portion of the air under pressure from the blower when the blower is operating, movable damper means associated with said port for controlling the supply of air to the burner, and temperature-controlled means for simultaneously adjusting the fuel-valve and the position of the damper means.

7. In combination, a burner, means for supplying a fluid fuel to the burner including a valve for adjusting the rate of fuel supply, means including a blower for supplying combustion air to the burner, an auxiliary air port communicating with the burner for admitting air under natural draft when the blower is not operating and permitting the escape of a portion of the air under pressure from the blower when the blower is operating, a self-opening shutter for said port, and temperature-controlled means for simultaneously and progressively opening the fuel valve and closing said shutter.

8. In combination, a burner, means for supplying a fluid fuel to the burner including a valve for adjusting the rate of fuel supply, means including a blower for supplying combustion air to the burner, an auxiliary air port communicating with the burner for admitting air under natural draft when the blower is not operating and permitting the escape of a portion of the air under pressure from the blower when the blower is operating, a self-opening shutter for said port, said shutter being closed by air under pressure from the blower, and temperature-controlled means for simultaneously limiting the closing movement of the shutter and proportionately opening the fuel-valve.

9. In combination, a burner, means for delivering a fluid fuel to the burner, valve means controlling the flow of fuel to the burner, means including a blower for delivering air under pressure to the burner means including a passage for either admitting air under natural-draft to the burner or functioning to permit the escape of a portion of the air under pressure from the blower, normally open damper-means for opening or closing said passage, and means effective only while the blower is operating for substantially simultaneously adjusting said valve-means to increase the fuel flow and adjusting said damper-means toward closed position to increase the air supply to the burner.

10. In combination, a burner, means for delivering a fluid fuel to the burner, valve-means controlling the flow of fuel to the burner, means including a blower for delivering air under pressure to the burner, means including a passage for either admitting air under natural-draft to the burner or functioning to permit the escape of a portion of the air under pressure from the blower, normally open damper-means for opening or closing said passage, and temperature-controlled means for substantially simultaneously adjusting said valve-means to increase the fuel flow and adjusting said damper-means toward closed position to increase the air supply to the burner.

11. In combination, a burner, means for delivering a fluid fuel to the burner, valve-means controlling the flow of fuel to the burner, means including a blower for delivering air under pressure to the burner, means including a passage for either admitting air under natural-draft to the burner or functioning to permit the escape of a portion of the air under pressure from the blower, a normally open damper-means for opening or closing said passage, and means for substantially simultaneously adjusting said valve-means toward or from a fully open position and adjusting said damper-means toward or from a fully closed position to proportionately increase or decrease the flow of fuel and air to the burner.

12. In combination, a burner, means for delivering a fluid fuel to the burner, valve-means controlling the flow of fuel to the burner, means including a blower for delivering air under pressure to the burner, means including a passage for admitting air under natural-draft to the burner and also functioning to permit the escape of air under pressure from the blower, normally open damper-means for opening or closing said passage, means for substantially simultaneously adjusting said valve-means to increase the fuel flow and adjusting said damper-means toward closed position to increase the air supply to the burner, and means for permitting opening movement of the valve-means only when the blower is functioning.

13. In combination, a burner, means for delivering a fluid fuel to the burner, valve-means controlling the flow of fuel to the burner, means including a blower for delivering air under pressure to the burner, means including a passage for admitting air under natural-draft to the burner and also functioning to permit the escape of air under pressure from the blower, normally open damper-means for opening or closing said passage, means for substantially simultaneously adjusting said valve-means to increase the fuel flow and adjusting said damper-means toward closed position to increase the air supply to the burner, and means for causing the valve-means to reduce the fuel flow to a minimum when the blower ceases to function.

14. In combination, a burner, a chamber supplying air to the burner, means including a passage for delivering a fluid fuel to said burner, valve means for controlling the flow of fuel through the passage, means for supplying air under super-atmospheric pressure to the chamber, an air duct communicating with the chamber, a shutter in said duct, means for normally moving the shutter to open position to admit air through the duct to the chamber under atmospheric pressure, said shutter being closed by a superatmospheric pressure in the chamber, and means actuated by the closing movement of the shutter for increasing the opening of the fuel valve means.

15. In combination, a burner, a chamber supplying air to the burner, means including a passage for delivering a fluid fuel to said burner, valve means for controlling the flow of fuel through the passage, means including a motor-driven fan for supplying air under super-atmospheric pressure to the chamber, an air duct communicating with the chamber, a shutter in said duct adapted to be closed by the pressure in the chamber when the fan is operating, means for normally moving the shutter to open position to admit air to the chamber under natural draft when the fan is not operating, and means actuated by a closing movement of the shutter for increasing the opening of the fuel valve means.

16. In combination with a fluid-fuel burner, means for supplying fuel to the burner including a valve for controlling the rate of fuel supply to the burner, a blower adapted to provide a substantially constant output of air under pressure and means for selectively directing a portion of this output to the burner for combustion air and venting the remainder of the blower output, said venting means also being effective to admit air to the burner under natural draft when the blower is not operating so that the rate of supply of combustion air can be varied from natural draft up to the full output of the blower.

17. In combination a fluid-fuel burner having a plurality of operating stages, means for supplying fuel to the burner including a valve for controlling the rate of fuel supplied, a blower adapted to provide a substantially constant output of air under pressure, and means for directing a portion of this output to the burner for combustion air during one operating stage of the burner and including means for venting the remainder of the blower output, said venting means also being effective during another operating stage of the burner to admit combustion air thereto under natural draft when the blower is not operating.

18. In combination with a fluid-fuel burner having a plurality of operating stages, means for supplying fuel to the burner including a valve for controlling the rate of fuel supplied, means including a blower for delivering a main supply of combustion air under pressure to the burner, and means including an auxiliary air port communicating with the burner for admitting combustion air under natural draft during an operating stage of the burner when the blower is not operating and permitting the escape of a portion of said air under pressure when said blower is operating during another operating stage of the burner.

ARTHUR N. SCHREUDER.